United States Patent
Hassan et al.

(10) Patent No.: US 8,568,021 B2
(45) Date of Patent: Oct. 29, 2013

(54) APPARATUS AND METHOD FOR MEASURING HEAT FLUX FROM RADIANT HEATER

(75) Inventors: Samer Hassan, Mississauga (CA); Bernd Schwank, Cologne (DE)

(73) Assignee: Schwank Ltd., Mississauga (CA)

( * ) Notice: Subject to any disclaimer, the term of this patent is extended or adjusted under 35 U.S.C. 154(b) by 140 days.

(21) Appl. No.: 13/248,097

(22) Filed: Sep. 29, 2011

(65) Prior Publication Data

US 2013/0083821 A1 Apr. 4, 2013

(51) Int. Cl.
*G01K 17/00* (2006.01)

(52) U.S. Cl.
USPC .......................................................... 374/29

(58) Field of Classification Search
USPC .............................................. 374/29; 129/91
See application file for complete search history.

(56) References Cited

U.S. PATENT DOCUMENTS

| | | | |
|---|---|---|---|
| 3,187,740 A | 6/1965 | Jones et al. | |
| 4,914,276 A * | 4/1990 | Blair | 219/390 |
| 5,224,542 A | 7/1993 | Hemsath | |
| 5,353,986 A | 10/1994 | Wortman et al. | |
| 5,429,112 A | 7/1995 | Rozzi | |
| 5,975,887 A | 11/1999 | Kamal et al. | |
| 6,155,098 A * | 12/2000 | Shapiro et al. | 73/29.01 |
| 6,325,535 B1 * | 12/2001 | Gibson et al. | 374/29 |
| 6,394,796 B1 | 5/2002 | Smith | |
| 6,485,174 B1 * | 11/2002 | Albrecht et al. | 374/29 |
| 6,718,968 B2 | 4/2004 | Cooley et al. | |
| 6,815,636 B2 | 11/2004 | Chung et al. | |
| 7,011,516 B2 | 3/2006 | Aust et al. | |
| 7,476,031 B2 * | 1/2009 | Xu et al. | 384/45 |
| 7,785,002 B2 * | 8/2010 | Dewes et al. | 374/179 |
| 7,793,683 B2 | 9/2010 | Noble et al. | |
| 7,913,683 B2 | 3/2011 | Schwank et al. | |
| 2006/0169275 A1 | 8/2006 | Murdoch | |
| 2007/0279235 A1 * | 12/2007 | Davis et al. | 340/606 |
| 2008/0130710 A1 * | 6/2008 | Dewes et al. | 374/179 |
| 2009/0064869 A1 | 3/2009 | Shealy et al. | |
| 2009/0241943 A1 * | 10/2009 | Schwank et al. | 126/91 A |

FOREIGN PATENT DOCUMENTS

| | | |
|---|---|---|
| EP | 0391818 A1 | 10/1990 |
| GB | 2161348 A | 1/1986 |

OTHER PUBLICATIONS

TechData Sheet, Naval Facilities Engineering Service Center, Infrared Radiant Heating, May 1996, Port Hueneme, California (5 pages).

* cited by examiner

*Primary Examiner* — Lisa Caputo
*Assistant Examiner* — Nasir U Ahmed
(74) *Attorney, Agent, or Firm* — Gifford, Krass, Sprinkle, Anderson & Citkowski, P.C.

(57) ABSTRACT

A method of measuring heat flux received on a selected area from a radiant tube heater includes providing an enclosing wall along side edges of the selected area and the radiant tube heater having a radiant heating tube mounted above the area. A heat flux sensor whose operating temperature can be regulated is used and is placed on a grid formed on the selected area, this grid defining a plurality of side-by-side sensor locations, each corresponding respectively to an area covered by one heat flux sensor. The heat flux received at each sensor location is measured and the sensor is moved sequentially from one sensor location to an adjacent sensor location after each measurement.

20 Claims, 8 Drawing Sheets

APPARATUS AND METHOD FOR MEASURING HEAT FLUX FROM RADIANT HEATER

FIELD OF INVENTION

This invention relates to methods and apparatus for measuring heat flux received on a selected area and, in particular, to method and apparatus for measuring heat flux from a radiant tube heater.

BACKGROUND OF THE INVENTION

Radiant tube infrared heaters are well-known in the heating industry and have numerous applications including heating buildings with high ceilings or frequent air volume changes. The use of heaters of this type is common because low energy costs are an important consideration for owners and users of industrial and commercial space. An important factor in achieving and determining heat and energy conservation is the need to measure and understand the heat being emitted from a heating source, such as a radiant tube heater. It is known that a low intensity infrared heater can have an average radiant efficiency from 35% to 40%, while a high intensity infrared heater can have an efficiency of 70%. Low intensity infrared heaters have a maximum operating temperature of about 1,200° F. while high intensity infrared heaters can operate at about 1,700° F. One advantage of an infrared radiant tube heater (RTH) is that it can readily burn natural gas which is the most environmentally acceptable fuel, particularly as it produces a low amount of pollutants when burned efficiently. A low intensity radiant tube heater normally consists of a fuel burner which can include a blower for combustion air, and a steel radiant tube which can range up to 70' or more in length. A typical diameter for such a radiant tube is about 4" and the tube can either be straight or bent (for example, to have a U-shape). An exemplary radiant tube heater has a sheet metal reflector covering the top and sides of the horizontal tube, this reflector partially shielding radiant and convection heat from escaping to a ceiling area above the heater. Thus, the reflector or shield reduces convectional losses and directs more radiant heat in the direction of the floor where it is needed.

Previous studies and papers have shown some of the advantages of a radiative or infrared heating system. They have shown, for example, that a radiative system uses less energy to achieve the same average mean radiant temperature compared to a convective system. It has been shown that a radiant heater can maintain comfortable conditions for occupants with less fuel consumption than warm air space heating units. A technical data sheet on infrared radiant heating by Naval Facilities Engineering Services Center, Port Hueneme, Calif., 93043-4370 (May 1966) discusses heat loss calculation in a building and the relation between RTH height and the coverage areas by providing rules of thumb for locating infrared heaters.

Feedback from heating customers has identified a need to measure heat flux and temperature at a specified distance from the centre of the radiant tube heater in order to assess the comfort level for persons in the vicinity of the RTH and provide better space heating designs. It will be understood that radiant tube heaters are positioned preferably to direct radiant incident rays towards the floor, humans and objects where maximum radiant heat flux is required. One needs to avoid directing incident rays towards a wall because this would result in heat energy being wasted through the wall.

In connection with the use of a radiant tube heater system, it is known that the first tube section of the radiant heating tube (for example, the first 10-foot section) reaches the highest temperature during operation of the heater. This fact must be considered when one determines the safe distance between the heater and persons or combustibles located in the area of the heater. This is one reason for developing a method and an apparatus capable of measuring the heat flux from a radiant tube heater and received over a selected measurement area.

SUMMARY OF THE PRESENT DISCLOSURE

According to the present disclosure, a method of measuring heat flux received on a selected area of a surface from a radiant tube heater includes providing an enclosing wall along side edges of the selected area which has a predetermined width and length and providing a radiant tube heater having a radiant heating tube mounted a selected height above the surface. The heating tube is located directly above a longitudinal centerline of the selected area and extends parallel to this centerline. There is also provided at least one heat flux sensor, the operating temperature of which is regulated as measurements are taken. A grid is formed on the selected area, this grid comprising a plurality of side-by-side sensor locations, each corresponding respectively to an area covered by one heat flux sensor. The heat flux received at each sensor location is measured by means of the at least one sensor and the or each sensor is moved sequentially from one sensor location to an adjacent sensor location after the heat flux on the one sensor location has been measured.

According to an exemplary form of this measuring method, the operating temperature is regulated by a water cooling system that includes at least one thermometer for measuring the water temperature of the cooling system. The exemplary radiant tube heater has a blower and a predetermined firing rate and the heating tube extends the length of the selected area where measurements of heat flux are taken.

According to the present disclosure, an apparatus for measuring heat flux received on a selected surface area from a radiant tube heater includes a wall arrangement for enclosing the selected surface area and adapted to extend along and upwardly from side edges of the selected surface area. The apparatus also has a movable, planar heat flux sensor capable of covering a selected small portion of the selected surface area and provided a voltage readout indicative of the heat flux received on the small portion over a selected time interval. There is also included a temperature control system for regulating an operating temperature of the heat flux sensor during use.

In a particular embodiment of the aforementioned apparatus, the wall arrangement is at least three feet high along its length. The heat flux sensor can be a semi-conductor thermopile capable of providing a voltage readout up to at least 1,000 millivolts.

These and other aspects of the disclosed method and apparatus for measuring heat flux will become more readily apparent to those having ordinary skill in the art from the following detailed description taken in conjunction with the accompanying drawings.

BRIEF DESCRIPTION OF THE DRAWINGS

So that those having ordinary skill in the art to which the present disclosure pertains will more readily understand how to make or carry out the subject invention, exemplary embodiments thereof will be described in detail herein below with reference to the drawings, wherein.

DETAILED DESCRIPTION OF EXEMPLARY EMBODIMENTS

Figure 1:
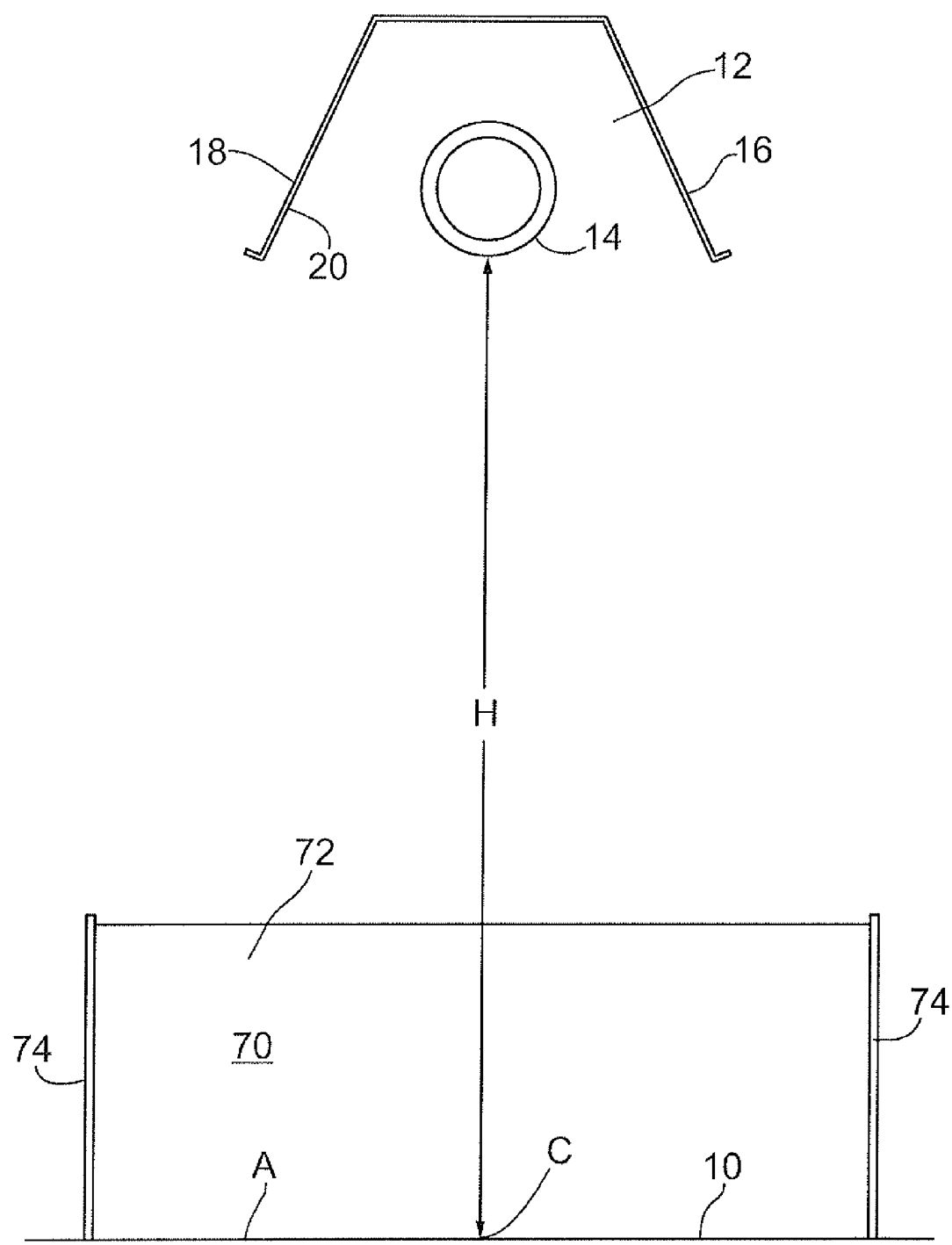
FIG. 1 is a schematic transverse cross-section taken in a vertical plane showing a standard radiant tube heater mounted over a selected area surrounded by a wall that extends along the side edges of the area.
Figure 3:
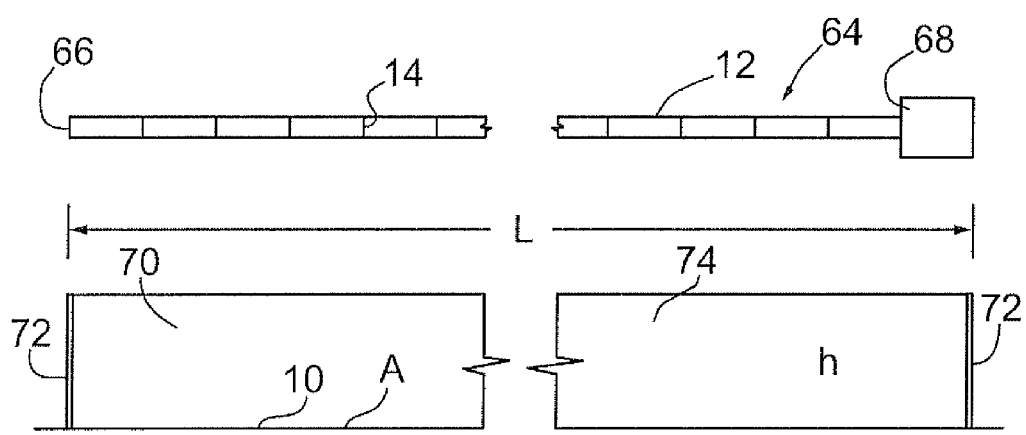
FIG. 3 is a schematic side elevation showing a radiant tube heater mounted above the selected area and the wall that extends around this area which is used for measuring heat flux at floor level, central portions of both the radiant tube and the longitudinal sides of the wall being omitted.

FIGS. 1 and 3 illustrate in a general way a method according to the present disclosure for measuring heat flux received on a selected area of a surface 10, such as the floor of a building or similar structure. The heat flux is emitted from a radiant tube heater 12 which can be of standard, known construction. For example, it can be a radiant tube heater of the type manufactured and sold by Schwank Ltd. of Mississauga, Ontario Canada. The radiant tube heater includes an elongate radiant metal tube 14. The tube is normally covered about its two sides and top by a metal reflector 16 that extends the length of the tube. An exemplary form of the reflector includes a metal inner reflector portion 18 with a highly reflective inner surface 20 and an outer reflective portion 22 which is only shown in FIG. 4 and which extends over the inner reflector portion. An exemplary version of the reflector has insulating ceramic material 24 arranged between the inner reflector portion and the outer reflector portion and capable of withstanding the high temperatures generated by the radiant tube 14. The purpose of the insulation material is to reduce the heat loss which would otherwise be wasted by convection and radiation to the roof or ceiling of the building. In a typical radiant tube heater (RTH), the horizontal width of the reflector is about 12.5" and the two bottom edges of the reflector are in approximate horizontal alignment with the bottom of the tube.

Figure 2:
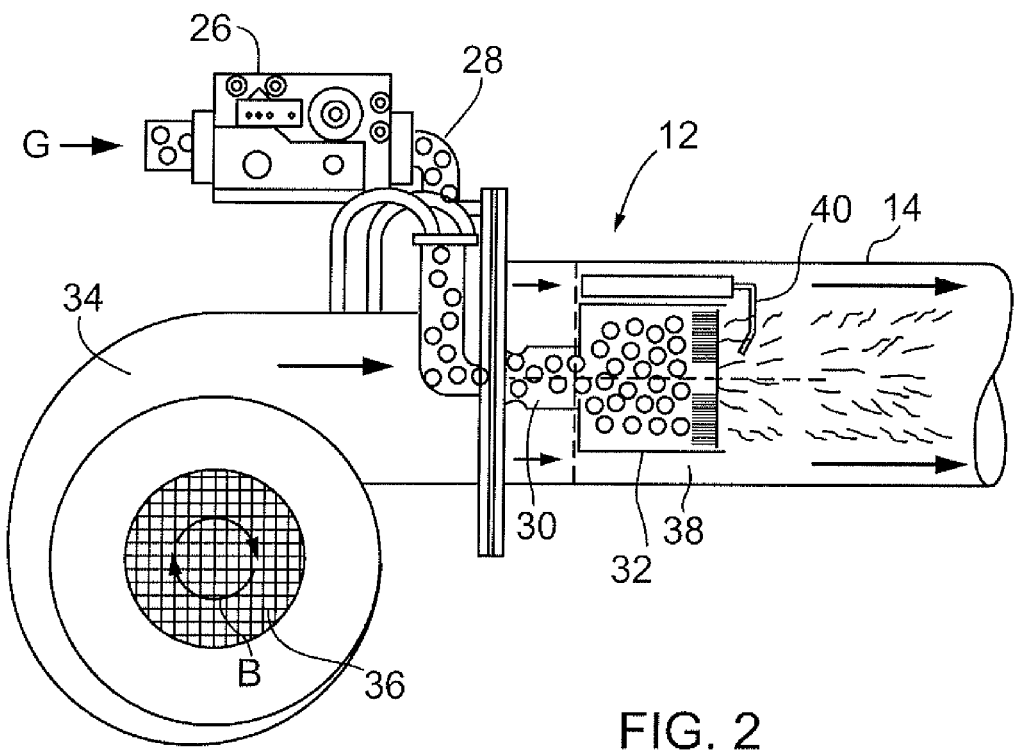
FIG. 2 is a schematic cross-sectional view of a radiant tube heater in use, this one showing a flame extending from a burner head, a major portion of the radiant tube being omitted along with the reflector for purposes of illustration.

FIG. 2 illustrates a burner end section of a radiant tube heater constructed in accordance with U.S. Pat. No. 7,793,683 dated Mar. 29, 2011, the drawings and description of which are incorporated herein by a reference. Only an upstream end section of the radiant tube 14 is illustrated for ease of illustration. The radiant tube 14 can comprise a plurality of sections arranged end to end as is well known to those skilled in the radiant heating art. Typically, each section is 10 feet in length, with a tube having a diameter of about four inches. The tube is heated by the flame from the burner and combustion gases to emit infrared radiant heat which is emitted and reflected downwardly to the floor surface or objects below the heater. Shown in FIG. 2 is a gas valve governor, or gas valve unit 26, for the heater which connects to one end of a gas pipe 28. This gas pipe extends to a burner nozzle 30 and a burner head 32 mounted on the nozzle. The radiant heater system also includes a blower or blower fan 34 having a side air inlet 36 into which external air is drawn. The blower has an outlet section which extends tangently relative to the blower fan and which is connected to the upstream end of the radiant tube. The burner head 32 is mounted within the radiant tube (or a tubular extension thereof) and is adapted for mixing combustible gas and air and for delivering the resulting mixture into an upstream end section of the radiant tube. The burner head is generally cylindrical and an annular space 38 can be provided between the burner head and the tube as shown. The heater can be provided with natural gas or LPG gas as indicated by the arrow G taken from a suitable source and delivered through the gas valve unit. Combustion air provided by the blower enters through vents or holes distributed about the periphery of the burner nozzle 30. The combustible mixture exiting from the burner head 32 is ignited by an ionization electrode 40 so as to produce a long laminar flame that extends a substantial distance down the radiant tube with the initial 10 foot section of the tube generally being the hottest section. The preferred material for the radiant tube 14 is stainless steel or aluminized steel, at least for an upstream section thereof which surrounds the hottest part of the flame and the burner head. The remaining portion of the radiant tube can be cold rolled steel.

Figure 4:
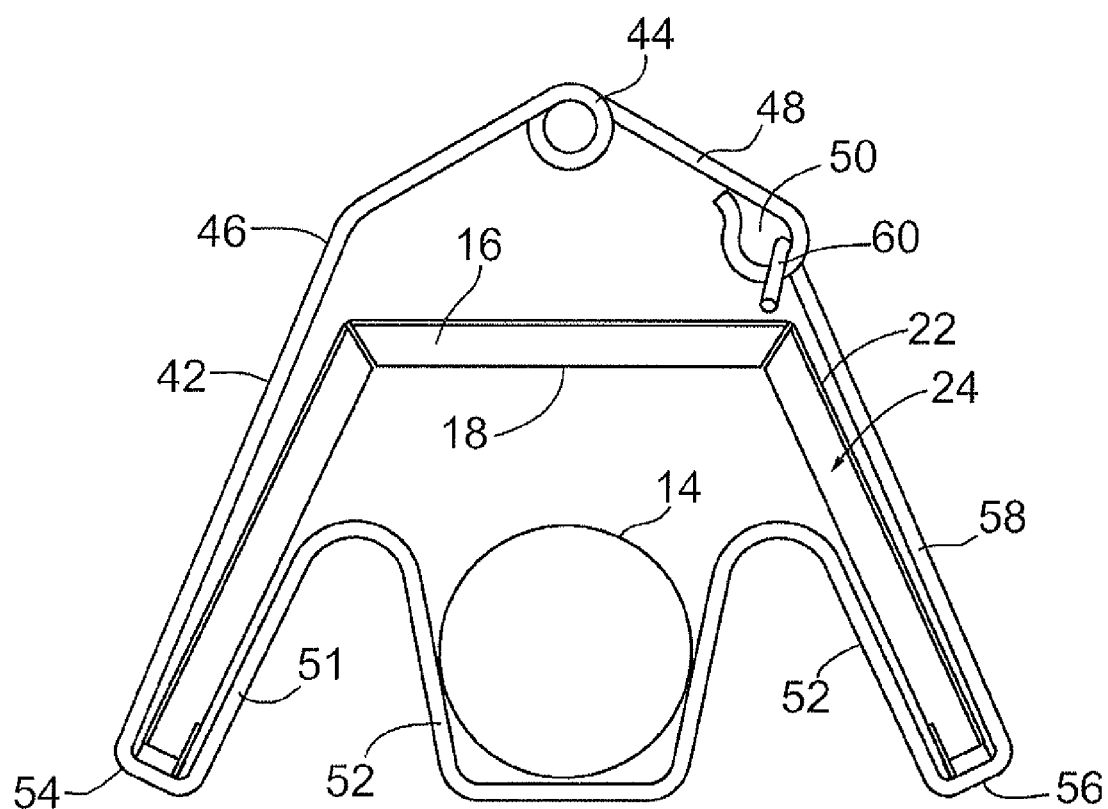
FIG. 4 is a transverse vertical cross-section of a reflector and its radiant tube showing a hanger used to support both the reflector and the tube.

Both the radiant tube and its reflector 16 can be hung from a ceiling or roof trusses with the use of a series of hangers 42, one of which is illustrated in FIG. 4. These hangers can be made from bent metal rods or wires in a manner known per se. The illustrated hanger has a central, top loop 44 which can be attached to the end of a chain or hanging wire extending from the ceiling or truss. Sloping downward from opposite sides of the centre loop are a bent arm 46 and a shorter arm 48, which forms an end loop at 50. This exemplary hanger includes a bottom section which has a substantially U-shaped central portion 52 sized to receive the radiant tube 14 as shown. The bottom section of the hanger also includes two bent connecting portions 51, 52 that are integrally connected to the central portion and that extend respectively to bottom ends of the hanger. The two bottom ends 54, 56 of the hanger are sized and adapted to support the two bottom ends of the reflector as shown. Extending upwardly from the bottom end 56 is a resilient end section 58 which has a hook 60 at its upper end. After the hanger is mounted around both the tube and the reflector, the hook is inserted through the end loop 50 so the hanger forms a completely enclosing connector able to support the tube and the reflector from the ceiling or roof truss.

An improved method and apparatus for measuring heat flux received on a selected area of a surface from a radiant tube heater 12 has been developed. FIGS. 1, 3, 7 and 8 illustrate schematically this new method and apparatus for measuring heat flux using a heat flux sensor 62 illustrated separately in FIGS. 5 and 6. An exemplary form of this sensor is constructed so that its temperature can be controlled or regulated during the measurement process. FIG. 3 illustrates a radiant tube heater system indicated generally by reference 64 and shown in FIG. 3 without a reflector 16 for ease of illustration. The system includes the aforementioned elongate radiant tube 14 having a distal end at 66 and the above described gas burner and blower combination indicated generally at 68 at an upstream end. The radiant tube itself is illustrated as being of indefinite length since its length can vary, for example it can be 30 feet, 50 feet or 70 feet or more in length. Although the support hangers 42 are not illustrated in FIG. 3, it will be understood that they are arranged at regular intervals along the length of the radiant tube in order to support same by means of chains or cables extending from the ceiling or roof truss. For heat flux measurement purposes, an enclosing wall 70 is provided along the side edges of the selected area where the heat flux measurements are to be taken. An exemplary form of the wall extends along both the longitudinal sides of the selected area indicated at A and also along two opposite ends of the selected area. Thus the wall 70 can include two end walls 72 as well as two longitudinal side walls 74. It will be appreciated that the enclosure wall 70 need not necessarily extend along all four edges of the selected area as it is possible that one of the edges of the selected area can be defined by the wall of a building or a structure itself, particularly at the end of the selected area. As can be seen from FIG. 1, the radiant tube 14 is located directly above a longitudinal centerline located at C of a selected area, the tube extending parallel to this centerline. The surface forming the selected area can be concrete or other form of hard surface such as a tiled surface. An exemplary form of the enclosing wall has a length L which can correspond substantially to the length of the radiant tube 14. Thus, in the case of a radiant tube having a length of 70 feet, the length or distance L of the enclosing wall in the direction of the tube can also be 70 feet but it is possible for the length L to be shorter than the tube. For a series of measurements of heat flux made by the method described herein, the horizontal width of the selected area was 65 inches but it will be understood that the heat flux measuring area can be extended if desired.

The height of the enclosing wall can vary but in an exemplary measuring arrangement, the height was about 3 feet. Although the height can be higher than 3 feet, it should not be too high as the heat generated by the RTH should be able to escape from the enclosed area so that the heat flux measurements are not adversely affected. In one embodiment, the enclosing wall was made of cardboard panels but other materials such as wood or plastic can be used for this purpose. The function of the enclosing wall is to prevent undesirable air currents in the region of the measurement area surrounded by the wall. Such currents can be caused by persons walking near to the measurement area or by moving equipment, for example.

Figure 5:
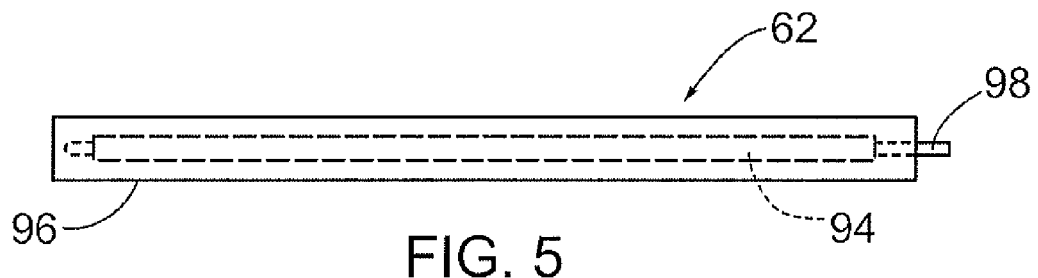
FIG. 5 is a side edge view of a heat flux sensor used to measure heat flux received on its planar upper surface.
Figure 6:
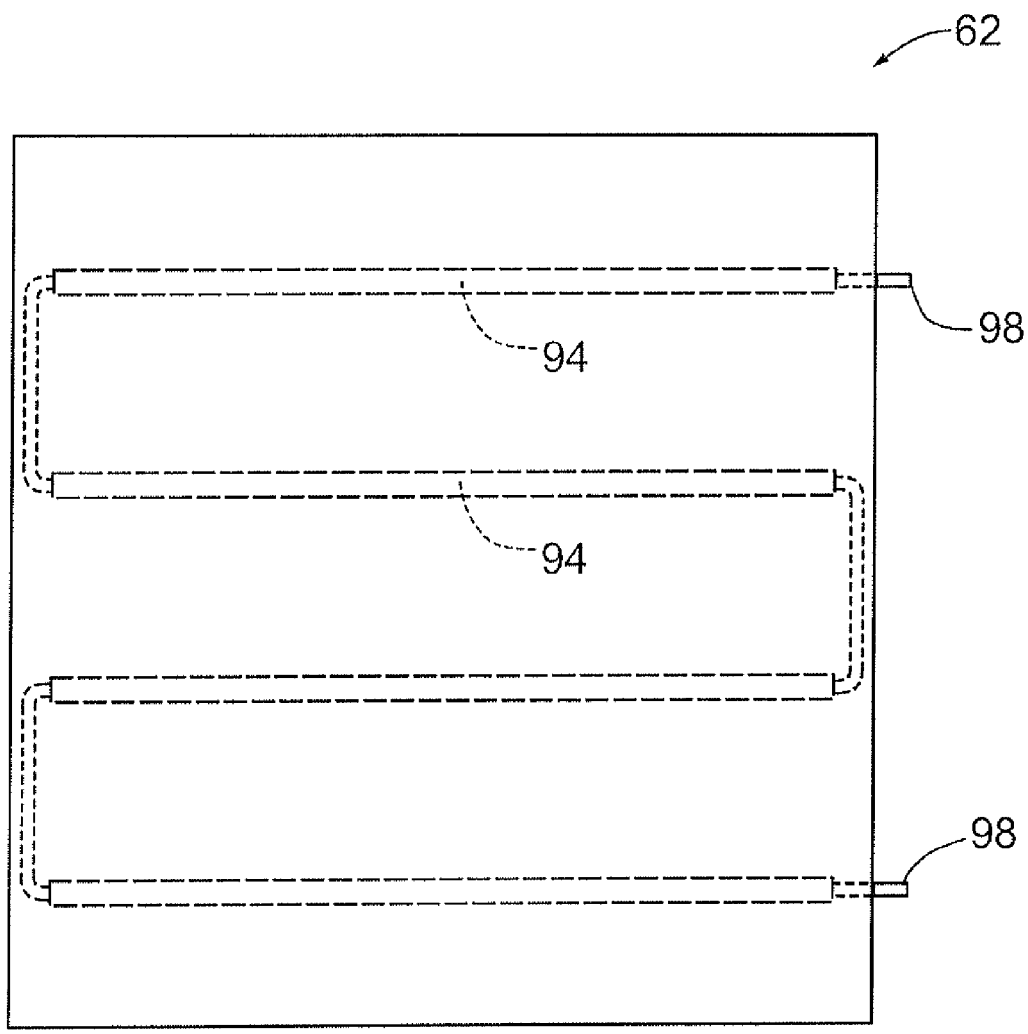
FIG. 6 is a top view of the heat flux sensor of FIG. 5.
Figure 7:
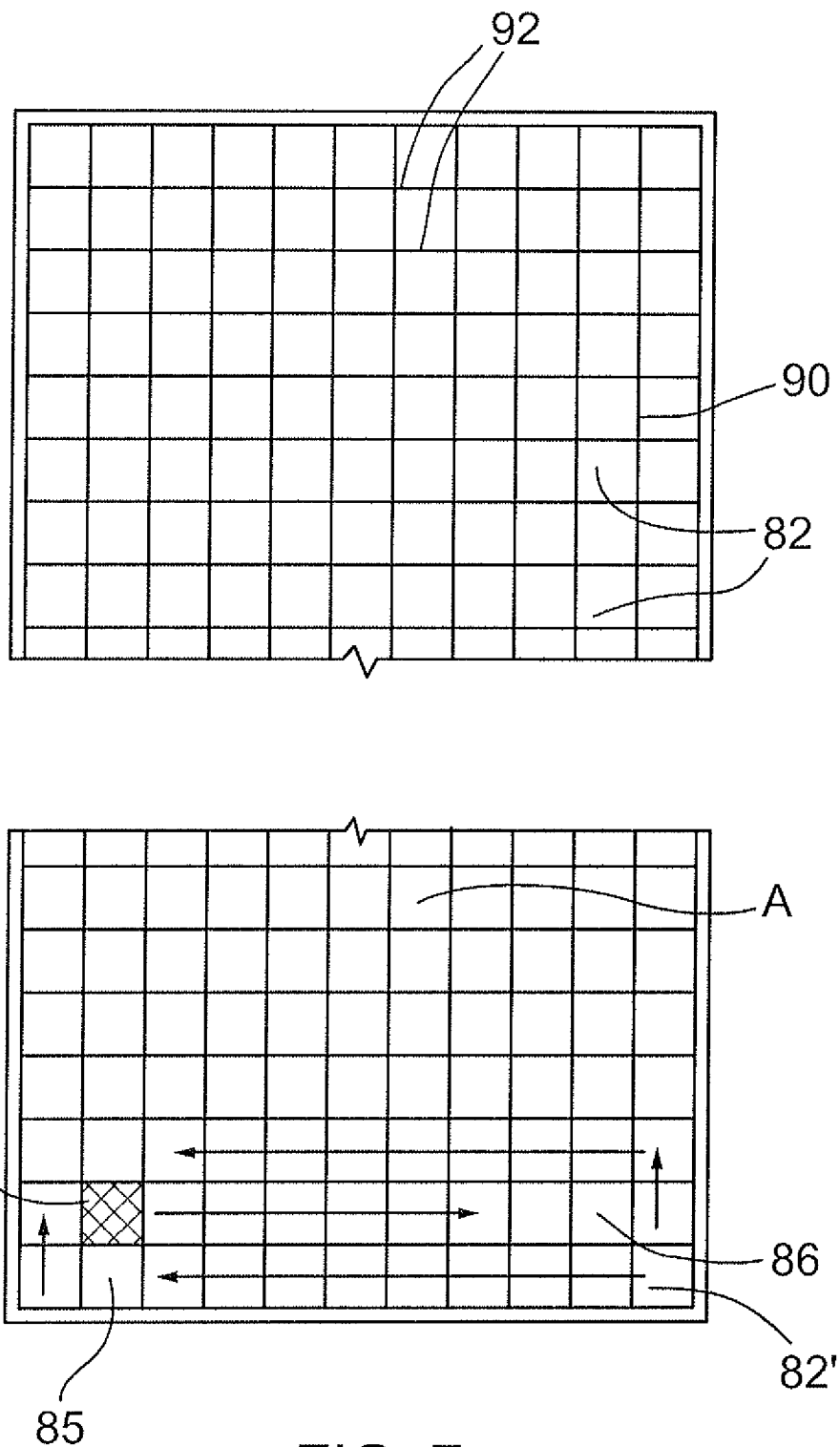
FIG. 7 is a schematic plan view of the walled enclosure of FIG. 1, showing a grid of side-by-side squares drawn or otherwise formed on the floor surface.

A measurement grid 80 shown in FIG. 7 is formed on the selected area A for the heat flux measurements. The grid 80 comprises a plurality of side-by-side sensor locations or areas 82 each having length and width dimensions corresponding approximately and respectively to the length and width dimensions of the heat flux sensor 62. The grid 80 can, for example, be drawn or painted on the measurement area A. Thus, if the heat flux sensor is square or substantially square as shown in FIGS. 5 and 6, each sensor location or area 82 is also square. An exemplary sensor used by the applicant was formed from a geothermal heat flux transducer available from International Thermal Instrument Company of Delmar, Calif. (type GHT-1C). This sensor measures 6 inches×6.5 inches and has a standard height of 0.225 inch. This known sensor was modified so that its operating temperature could be regulated. In the exemplary method of measuring heat flux, the operating temperature is regulated by a water cooling system described hereinafter and illustrated in FIG. 8. The heat flux from the heater received at each sensor area 82 is measured by means of a heat flux sensor 62. If desired, more than one heat flux sensor could be used to conduct the heat flux measurements over the selected area A, particularly if the selected area is quite large. The present method of measuring heat flux includes measuring the heat flux received at each of the sensor locations 82 with the sensor being moved sequentially from one sensor location or area to an adjacent sensor location or area 82 after the heat flux on the first mentioned sensor area has been measured.

With particular reference to the grid shown in FIG. 7, the heat flux measurement process can commence, for example, by placing the sensor 62 at one corner of the grid, for example at the sensor area 82'. The arrows at the bottom of FIG. 7 illustrate how the sensor can be moved transversely across the measurement area A from the corner area. After the heat flux measurement has been ascertained at each square in the first or bottom row 85, the sensor 62 is moved up to the adjacent transverse row indicated at 86. The measurement process is continued until all of the sensor areas 82 over the area A have been measured.

Although the illustrated measurement grid of FIG. 7 is formed by longitudinal lines 90 and transverse lines 92 drawn on the surface defining the sensor locations 82, it should be appreciated that other patterns can be used to form the measurement grid for the purpose of measuring heat flux. For example, rows of small spots or circles can be drawn on the surface so as to define the corners at which the heat flux sensor should be placed for each heat flux measurement.

The aforementioned exemplary heat flux transducer from International Thermal Instrument Company has a range of 1 millivolt to 1,200 millivolts and measures the local heat flux in one direction with results being expressed in watts per square meter. For measuring the heat flux from a radiant tube heater, an exemplary sensor is capable of providing a voltage readout up to at least 1,000 millivolts. The aforementioned heat flux transducer 62 from International Thermal Instrument Company (ITIC) has a sensitivity of 1.1 watts/meter$^2$ per 1MV and it operates in temperatures ranging from −100° F. to 250° F. The DC signal generated by the transducer is conducted to the readout instrument by means of a waterproof cable. After obtaining thermal equilibrium with its surroundings, the sensor develops a voltage which is directly proportional to the local heat flux. The principle of operation of this sensor is that the flow of heat through the transducer creates a minute temperature difference between its surfaces. The sensor has a multi-element, semi-conductor thermopile consisting of hundreds of Bi/Te elements that generate the DC voltage via the Seebeck effect. The signal produced by the sensor 62 is directly proportional to the heat flux through the transducer.

Experimentation with the use of the aforementioned sensor showed that there was a need to regulate its operating temperature in order to prevent significant fluctuations in the readouts at a particular location on the measurement surface. One reason for this need is that the floor on which the sensor is placed acts as a heat storage reservoir and, once heated, the floor gives off heat by radiation to the surroundings. In order to be able to regulate the operating temperature of the sensor, a water cooling system was provided, this system including at least one thermometer (not shown) for measuring the water temperature of the cooling system. To enable water cooling, the heat sensor 62 was modified by the addition of grooves or channels 94 adjacent a bottom side 96 of the sensor. Two connecting nipples 98 were added along one side edge of the sensor so as to provide an inlet and an outlet for the flow of water and these nipples were attached to plastic hoses.

Figure 8:
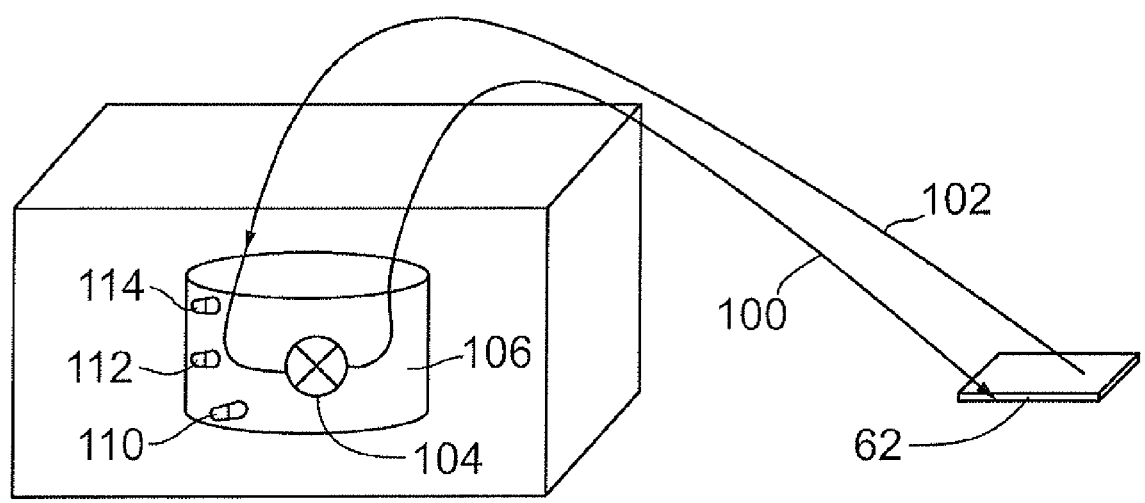
FIG. 8 is a schematic perspective view illustrating a water cooling system for the heat flux sensor of FIGS. 5 and 6.

A cooling set up is illustrated schematically in FIG. 8 wherein two plastic hoses 100, 102 are shown together with a water pump 104. The water pump can be a submersible pump placed inside a small reservoir such as a pail indicated at 106.

According to one example of the measuring method, water temperature in the reservoir or pail was kept constant at 69° F. either by use of an ice pack or by adding cold water. The water temperature in the reservoir was measured carefully using 12 type K thermocouples divided into 3 sets of 4 thermocouples. A first set 110 is located at the bottom of the water reservoir while a second set 112 is set at mid-height in the water. A third set 114 is arranged just below the surface of the water of the reservoir. The 4 thermocouples of each set were connected in parallel and the free ends of each set were connected to a suitable thermometer in order to obtain a water temperature reading. An exemplary thermometer for this purpose is a Fluke thermometer. Three thermometers in all were used to measure the temperature of the water in the reservoir and to maintain the temperature at the desired level.

In an exemplary embodiment of the three sets of thermocouples 110, 112 and 114, the four K type thermocouples of each set extend about a circle and form a centre cross in this circle. One of the two wires of each thermocouple is twisted together with a wire from each of the other 3 thermocouples so as to provide an average read out. The free end of each thermocouple is free to sense the local water temperature. The Fluke thermometer used to measure the temperature indicated by each set is a 52-II voltmeter capable of reading two temperatures at the same time, one of these being the water temperature and the other being the ambient temperature. It will be appreciated that this is only one temperature measuring system that can be used and other systems for accurately monitoring the temperature of the water in the reservoir are available and can be used, if desired.

Once the above described equipment has been set up to obtain heat flux measurements from a radiant tube heater, the radiant tube heater (RTH) at a selected operating height, for example 100 inches above the measurement area, is turned on with the sensor 62 at a selected location on the measurement grid. There is then a waiting period to achieve a steady state condition at which the temperature on the surface of the radiant tube does not change with time. This steady state condition was determined using the tube temperature measuring system described hereinafter. Under normal operating conditions, the waiting period is approximately 30 minutes. At the same time as the RTH is operating to achieve this steady state, the water pump 104 is operating so that water is circulating in and out of the heat flux sensor 62 maintaining it at the desired temperature (69° F.). The millivolt readings from the heat sensor were allowed to fluctuate within 2% according to the manufacturer's specifications and it was found that readings rarely fluctuated more than 3% compared to the value of average readings. Errors in readings can be caused by changes in ambient temperature, people passing close to the measurement area A, environmental radiation and excessive noise. All of these possible sources of error are minimized as much as possible in order to obtain acceptable readings from the sensor.

Figure 10:
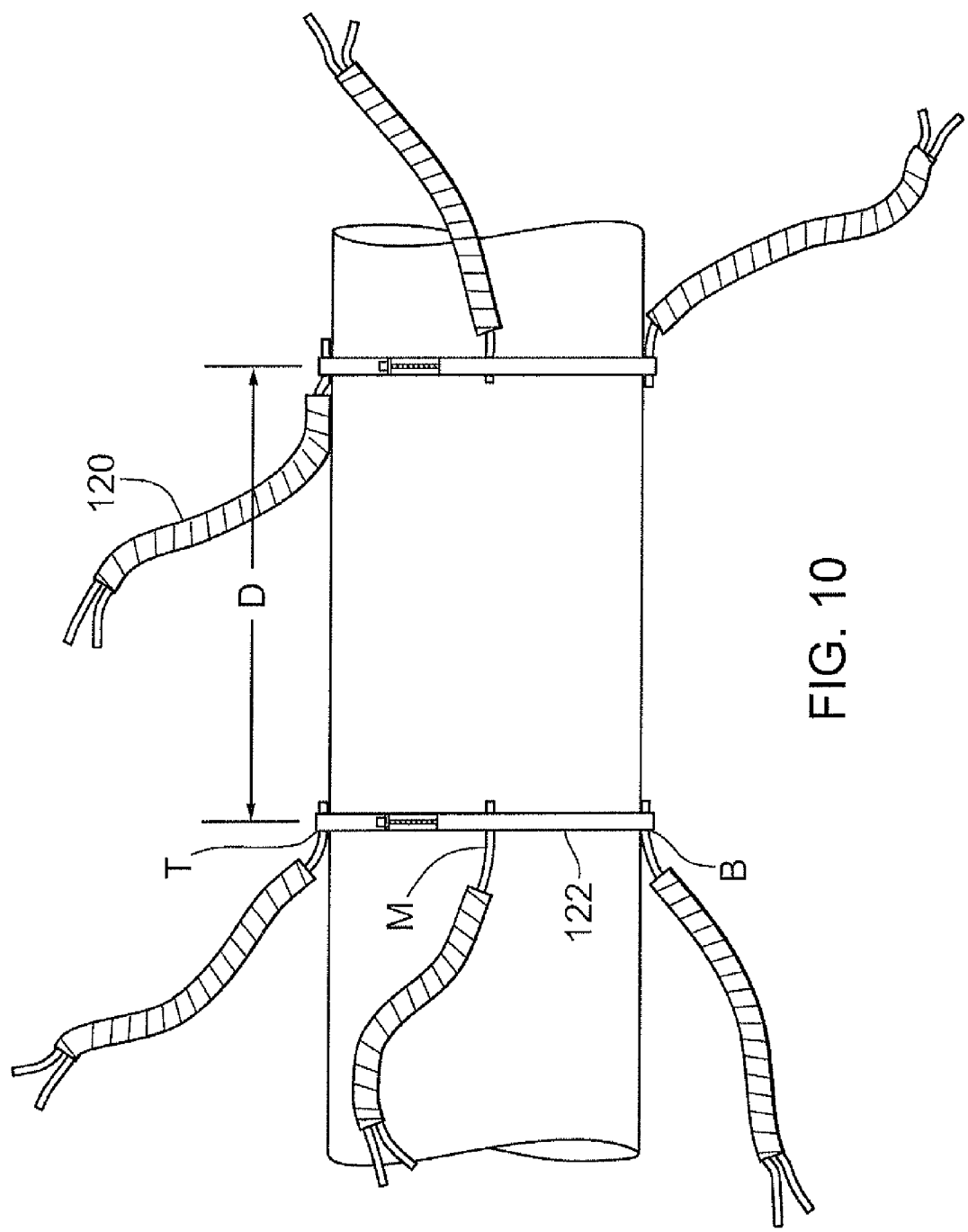
FIG. 10 is a side view showing a section of the radiant tube fitted with sets of thermocouples to measure tube temperature.

In order to determine when the radiant tube heater 12 had reached a steady state condition after it was turned on, a method of measuring the temperature of the radiant tube at regular intervals along its length was developed and this measurement system is illustrated in FIG. 10. Type K thermocouples 120 were used to accurately measure the surface tube temperature. In an exemplary set up for temperature measurement, the thermocouples were placed at one foot intervals indicated by the distance D along the length of the heater tube. As shown, three thermocouples 120 were placed at these one foot intervals so that, in the case of a radiant tube having a length of 70 feet, 210 thermocouples were used. At each one foot interval, there was one thermocouple at the top of the tube indicated at T, a second thermocouple mounted at the bottom extremity of the tube indicated at B. The third thermocouple was located at mid-height indicated at M along one side of the tube. The three thermocouples at each interval were attached to the surface of the tube using a stainless steel pipe clamp 122 of standard construction. Because of driven-flame buoyancy, a radiant tube heater generally has a higher tube temperature at the top of the tube and a lower tube temperature at the bottom of the tube. Theoretically and in practice, the temperature at mid-height falls between the top surface tube temperature and the bottom surface tube temperature. Tables 1 and 2 set out below provide sample readouts of the tube temperatures at the top of the tube, at mid-height and at the bottom of the tube. Table 1 provides both the observed temperature readings using the thermocouples 120 and predicted temperature readings for the first 10 foot section of a radiant tube, three readings for each foot. Table 2 provides both the observed and predicted temperature readings for the third ten-foot section. It will be seen that there is good agreement between the observed temperatures and the predicted temperatures at each location. As explained below, the predicted temperatures for each 10 foot section of the tube can be used to generate an analytical function which is used as a boundary condition in a computational fluid dynamics (CFD) simulation. Individual temperature readings can be taken by means of the thermocouples 120 attached to a Fluke-289 voltmeter capable of providing very precise readouts with an accuracy rating of between 10 and 15 millivolts. This voltmeter is connected to the free end of each thermocouple after the surface temperature of the heater has reached a steady state, usually after about half an hour, in order to measure the tube surface temperature.

TABLE 1

Measured and predicted temperatures on the first 10-Ft tube of a radiant tube heater of a 70-Ft tube length.

| Distance From Burner (ft) | Angle On Tube | Observed | Predicted |
|---|---|---|---|
| 10 | 3.14 | 1061 | 1027.580186 |
| 10 | 1.57 | 979 | 963.3801865 |
| 10 | 0 | 913 | 956.4801865 |
| 9 | 3.14 | 1086 | 1068.706838 |
| 9 | 1.57 | 1032 | 1004.506838 |
| 9 | 0 | 946 | 997.6068376 |
| 8 | 3.14 | 1097 | 1096.892929 |
| 8 | 1.57 | 1041 | 1032.692929 |
| 8 | 0 | 1003 | 1025.792929 |
| 7 | 3.14 | 1118 | 1117.111267 |
| 7 | 1.57 | 1071 | 1052.911267 |
| 7 | 0 | 1034 | 1046.011267 |
| 6 | 3.14 | 1139 | 1129.283372 |
| 6 | 1.57 | 1083 | 1065.083372 |
| 6 | 0 | 1070 | 1058.183372 |
| 5 | 3.14 | 1111 | 1128.279487 |
| 5 | 1.57 | 1050 | 1064.079487 |
| 5 | 0 | 1067 | 1057.179487 |
| 4 | 3.14 | 1091 | 1103.91857 |
| 4 | 1.57 | 1020 | 1039.71857 |
| 4 | 0 | 1036 | 1032.81857 |
| 3 | 3.14 | 1027 | 1040.968298 |
| 3 | 1.57 | 954 | 976.7682984 |
| 3 | 0 | 1018 | 969.8682984 |
| 2 | 3.14 | 917 | 919.145066 |
| 2 | 1.57 | 830 | 854.945066 |
| 2 | 0 | 893 | 848.045066 |
| 1 | 3.14 | 698 | 713.113986 |
| 1 | 1.57 | 643 | 648.913986 |
| 1 | 0 | 654 | 642.013986 |

TABLE 2

Measured and predicted temperatures on the third 30-Ft tube of a radiant tube heater of a 70-Ft tube length.

| Distance From Burner (ft) | Angle On Tube | Observed | Predicted |
|---|---|---|---|
| 30 | 3.14 | 666 | 654.647 |
| 30 | 1.57 | 633 | 622.097 |
| 30 | 0 | 565 | 571.647 |
| 29 | 3.14 | 670 | 666.2237 |
| 29 | 1.57 | 625 | 631.9737 |
| 29 | 0 | 575 | 579.8237 |
| 28 | 3.14 | 662 | 678.8636 |
| 28 | 1.57 | 640 | 642.9136 |
| 28 | 0 | 589 | 589.0636 |
| 27 | 3.14 | 689 | 692.5667 |
| 27 | 1.57 | 657 | 654.9167 |
| 27 | 0 | 602 | 599.3667 |
| 26 | 3.14 | 710 | 707.3328 |
| 26 | 1.57 | 653 | 667.9828 |
| 26 | 0 | 621 | 610.7328 |
| 25 | 3.14 | 726 | 723.1621 |
| 25 | 1.57 | 689 | 682.1121 |
| 25 | 0 | 630 | 623.1621 |
| 24 | 3.14 | 741 | 740.0545 |
| 24 | 1.57 | 688 | 697.3045 |
| 24 | 0 | 645 | 636.6545 |
| 23 | 3.14 | 755 | 758.0101 |
| 23 | 1.57 | 709 | 713.5601 |
| 23 | 0 | 642 | 651.2101 |
| 22 | 3.14 | 783 | 777.0288 |
| 22 | 1.57 | 740 | 730.8788 |
| 22 | 0 | 685 | 666.8288 |
| 21 | 3.14 | 793 | 797.1106 |
| 21 | 1.57 | 759 | 749.2606 |
| 21 | 0 | 658 | 683.5106 |

Figure 9:
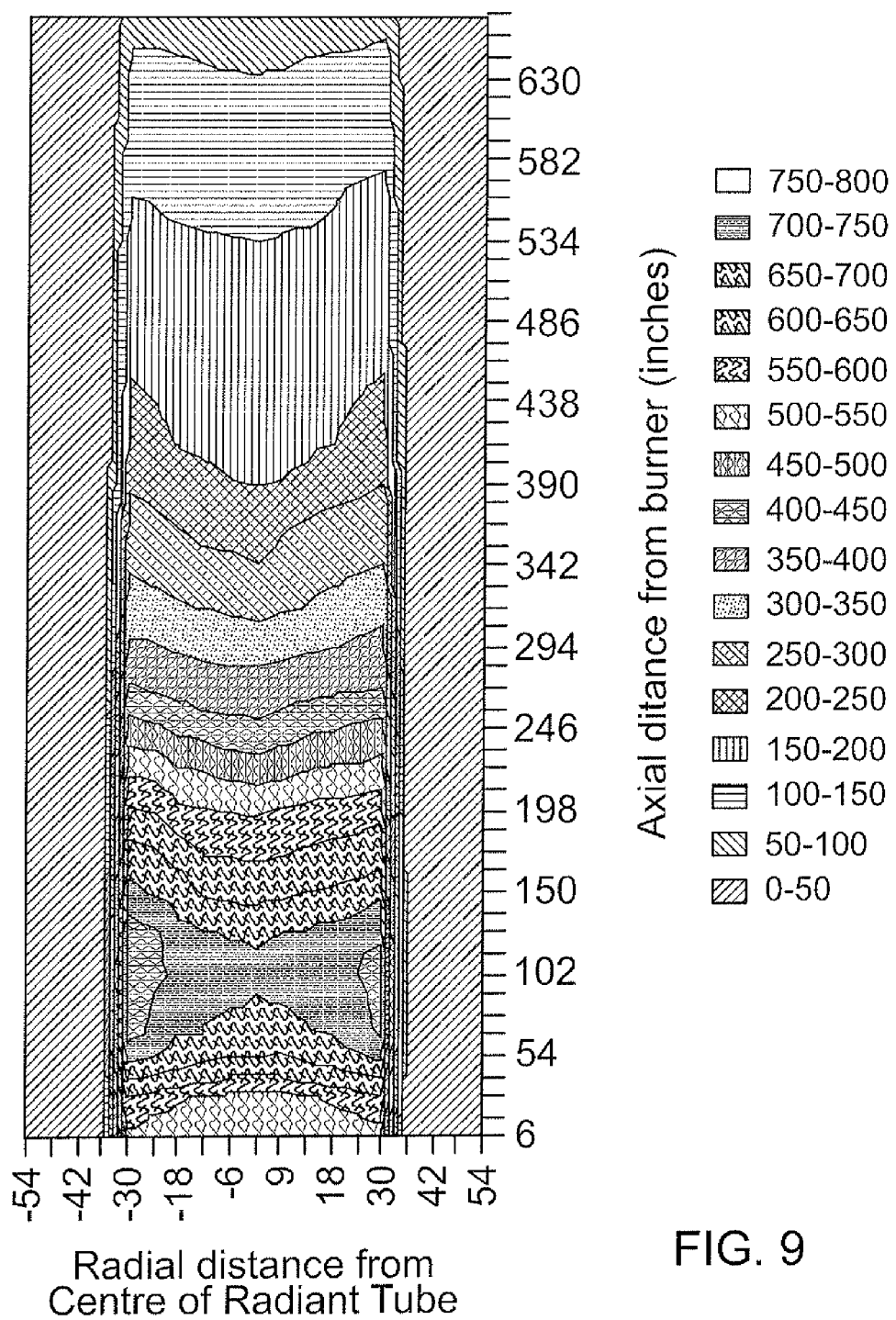
FIG. 9 is a graphical presentation showing the variation in heat flux measured along the length of a radiant tube.

FIG. 9 shows the heat flux readings that were measured using the measurement method described above and using a radiant tube heater with a firing rate of 200K Btu/H with the length of its radiant tube being 70 feet. The radiant tube had a height H (see FIG. 1) of 100 inches over the measurement area A. The width of the measurement area was 65 inches and the length was 660 inches (55 feet) with one end of the measurement area located at the upstream end of the radiant tube. The minimum value obtained for the RTH located at 100" is around 60 W/m$^2$.

Separate Numerical Study Employing CFD

In order to validate the heat flux measurements taken using the above described measuring method, CFD software was used to compute the theoretical heat flux on a corresponding test floor area. In order to develop and use this software, a number of parameters pertaining to the tube-reflector system needed to be determined and addressed. One of these considered as an operating variable for the computer program study was the height of the RTH above the floor area which was set initially at 100 inches. Subsequently, maximum and average values of the numerical simulation results for the tube-reflector assembly were determined for heights of 9 feet, 10 feet, 11 feet 4 inches and 12 feet and were compared with actual temperature measurements taken in accordance with the above described measuring method. In the CFD numerical study, the effects of minor parts of the RTH such as clamps, screws, wire hangers and hanger plates were eliminated. The study used seven interpolation functions (see below) which yielded an approximate temperature data distribution along and across the radiant tube. These seven functions, each for a respective one of seven 10 foot sections of the radiant tube were generated by Table 3D Curve software and these functions were used to approximate the tube temperature along each 10 foot length. The numerical results of heat flux were calibrated with the experimental data which was affected by slight changes of ambient temperature, material emissivity, environmental radiation and local meshing settings.

The temperature of the radiant tube was taken at a steady state condition and this temperature acted and served as boundary conditions for the simulation code. Although the flow simulation software can accommodate data from a few points, because the data points were in the order of 100 or more, it was necessary to use an analytical function. The obtained data was fed into another software program, Table 3D Curve, in order to generate the corresponding interpolation functions.

The experimental readings based on the above mentioned measuring method were compared to the numerical results produced by the CFD software for a radiant tube height at 100 inches as well as greater heights. The comparison between the experimental data and the generated numerical values produced by the analytical function indicated a definite correlation with the correlation percentage being between 97 and 98%.

The interpolation functions for a 200K Btu/H RTH (70 ft. tube length) were as follows:

$(321.38889+389.31365*z-74.8053*z^2+6.3272*z^3-0.21047*z^4+878.08013*theta-1176.311451*theta^2+396.82725*theta^3+32.11088*theta^4-21.27832*theta^5).$   Function 1:

$(63152.09708-21477.29034*z+2935.88384*z^2-198.421465*z^3+6.620202031*z^4-0.087222222*z^5+56.30573*theta-5.760882794*theta^2).$   Function 2:

$(1279.412121-39.53914141*z+70.31847134*theta+0.53156565656*z^2-3.63097894438*theta^2-1.08280254777*z*theta).$   Function 3:

$(151787.528972015-17354.547916896*z+746.039478681*z^2-14.233974309*z^3+0.101641414*z^4+22.292993631*theta).$   Function 4:

$(91499.670070302-8137.9256710687*z+273.631019897*z^2-4.097060320*z^3+0.023018648*z^4+20.636942675*theta-1.014239929*theta^2).$   Function 5:

$(627.8227272727-2.4744949495*z+35.8656629994*theta-0.0391414141*z^2-1.8864862672*theta^2-0.2451264235*z*theta).$   Function 6:

$(-434.6960678210+28.2928932179*z+94.0109695683*theta-0.2640692641*z^2-1.8256318715*theta^2-1.1093418259*z*theta).$   Function 7:

Function 1 is used for the first 10 ft length of the radiant tube and each of the subsequent functions is used for a respective one of the following six 10 ft. sections of the tube.

The problem of determining leaving and net radiant heat fluxes is solved using a discrete Monte Carlo method. This numerical method solves the following radiative transfer equation (RTE) in steady state:

$$\frac{\mu \partial I_\lambda}{\partial x} + \frac{\xi \partial I_\lambda}{\partial y} + \frac{\eta \partial I_\lambda}{\partial z} = -(\kappa_\lambda + \sigma_{s,\lambda})I_\lambda + \kappa_\lambda I_{b,\lambda} + \frac{\sigma_{s,\lambda}}{4\pi} \int_{4\pi} \phi I_\lambda(\Omega) d\Omega$$

The first term of the above equation represents the spatial distribution of the radiant intensity, I, and the subscript $\lambda$ is to designate that each quantity in the RTE is taken as a function of the wavelength. The variables $\kappa$ and $\sigma$ represent the medium absorption and extinction coefficients. $\mu$, $\xi$, and $\eta$ are the directional cosines that describe the direction of the radiant intensity. φ is the scattering phase function which is equal to 1 in isotropic scattering. By numerically solving the above RTE equation, one can find the radiant intensity, I, at any point, wavelength, and direction in the enclosed area. This approach does not require calculation of view factor which is cumbersome in some cases. The above RTE does not have an analytical solution for most cases because of the complicated directional and spectral nature of thermal radiation exchange between solid objects of various complex 3D shapes.

The Monte Carlo approach was used to solve the above equation numerically. This approach uses computational mesh cells containing faces approximating the radiative surfaces. The cells are joined in clusters by a special procedure that takes into account the face area and the angles between the normal to the surface and the face in each partial cell. The cells intersected by boundaries between radiative surfaces of different emissivity are considered as belonging to one of these surfaces and cannot be combined in one cluster. The Monte-Carlo approach has been used in the CFD flow simulation to reduce computational time and minimize the computer memory requirements.

After trial and error, an environmental temperature of 85° F. and an ambient temperature of 68° F. were adopted. The environmental temperature is an approximate value of the average wall temperature surrounding the tube reflector-assembly. We also determined emissivities for different tubes, sensor and reflector material. The first two tube sections, each 10 feet in length, were assumed to act as black bodies and thus to have an emittance of 1. The emittance of the third and fourth tube sections was assumed to be 0.94 and the emittance of the last three tube sections was taken as 0.76. The total sensor area was split into three parts A, B and C with part A having the same emissivity as the first two tube sections, part B having the emissivity of the third and fourth tube sections and part C having the emissivity of the last three tube sections. These settings were determined by trial and error. Metallic surfaces have higher emittance at higher temperatures than at lower temperatures. There is a steep temperature gradient along the 70 foot radiant tube heater used in carrying out the present method, the temperature decreasing from a peak of 1,150° F. in the first tube section to only 300° F. approximately at the last 10 foot tube section. The first two tube sections, each 10 feet in length, have the highest emittance due to the radiant tube having the highest tube temperature along this portion, while the last three tube sections exhibit the lowest emittance due to their relatively low tube temperature. As indicated, the third and fourth tubes have an emittance of 0.94, which falls between 1 and 0.76.

The emittance of the aluminized steel that was used to carry out the heat flux measurements was taken as 0.09 and the source temperature for the burner was estimated to be around 220° F. The effect of solar radiation was excluded because the heat flux measurements, according to the present method, were taken in an area where the windows were covered by shutters. It was also assumed that the environment did not scatter or absorb thermal radiation from the RTH which is a valid assumption if the atmosphere is not very humid. Using these assumptions, the above equation was reduced to the following:

$$\frac{\mu \partial I_\lambda}{\partial x} + \frac{\xi \partial I_\lambda}{\partial y} + \frac{\eta \partial I_\lambda}{\partial z} = 0$$

Symmetry was used in the computational domain dividing it into two equal parts. The actual heat flux measurement results using the above described method showed that the maximum heat fluxes moved symmetrically to the two edges of the measurement plane having a width of 65 inches. This was translated in the software by taking into account in the calculations the two sloping surfaces of the reflector 16 as shown in FIGS. 1 and 4, and treating them as relatively specular surfaces, which is a valid assumption for optical or almost smooth surfaces where the surface roughness is very small compared to the wavelength of the electromagnetic wave. At a low temperature, most objects emit electromagnetic thermal radiation in a long infrared wave length. As the two sloping surfaces of the reflector are at relatively low temperatures compared to those of the flat top surface of the reflector located above the radiant tube, one can assume that the roughness of the sloping surfaces is not sensitive compared to the long infrared wavelength emitted. Thus, the corresponding reflection at these surfaces is much more specular than diffuse. Therefore, in the software simulation, the specular reflection condition of emissivity was considered to be 0.09 for the sloping sides of the reflector.

Results of Heat Flux Measurements

Set out below in Table 3 are the maximum and average heat flux readings obtained experimentally, numerically and using curve fit for five different RTH heights and a measurement area 65 inches wide and 666 inches long:

| | RTH Height | Heat Flux (w/m$^2$) (Experimental) | Heat Flux (w/m$^2$) (Numerical) | Heat Flux (w/m$^2$) (Curve Fit) |
|---|---|---|---|---|
| Maximum | 100" | 782 | 787 | 787 |
| Average | 100" | 358 | 344 | 342 |
| Maximum | 9 ft | 700 | 688 | 687 |
| Average | 9 ft | 310 | 303 | 307 |
| Maximum | 10 ft | 605 | 582 | 587 |
| Average | 10 ft | 285 | 275 | 272 |
| Maximum | 11 ft. 4" | 520 | 508 | 499 |
| Average | 11 ft. 4" | 250 | 246 | 242 |
| Maximum | 12 ft | 445 | 460 | 464 |
| Average | 12 ft | 218 | 230 | 230 |

The agreement between the numerical predicted results and the actual heat flux measurements using the method described above show that the Monte Carlo method solves accurately the RTE equation. For both the actual heat flux measurements and the numerical computations, a radiant tube heater having a firing rate of 200K Btu/H and a 70 foot radiant tube were used.

Heat flux measurements according to the present measuring method described above confirm that as the height of the RTH is increased, the maximum and average heat fluxes at the floor level do significantly decrease. It follows that the heat flux provided on the floor can be maximized by reducing the height between the floor and the RTH.

FIG. 9 shows the actual heat flux readings for the aforementioned RTH at a height of 100 inches over the measurement area. The data was obtained by moving the heat flux sensor along the first 55 feet of the radiant tube and across the 65 inch width of the area. It will be noted that the minimum value obtained for the RTH is around 60 W/m$^2$.

While the present invention has been illustrated and described as embodied in exemplary embodiments, e.g. embodiments having particular utility as methods for measuring heat flux from a radiant tube heater, it is to be understood that the present invention is not limited to the details shown herein, since it will be understood that various omissions, modifications, substitutions and changes in the forms and details of the disclosed method can be made by those skilled in the art without departing in any way from the scope of the present invention. For example, those of ordinary skill in the art will readily adapt the present disclosure for various applications without departing from the scope of the present invention.

The invention claimed is:

1. A method of measuring heat flux received on a selected area of a surface from a radiant tube heater, said method comprising:
   (a) providing an enclosing wall along side edges of said selected area which has a predetermined width and length;
   (b) providing a radiant tube heater having a radiant heating tube mounted a selected height above said surface, said heating tube being located directly above a longitudinal centerline of said selected area and extending parallel to said centerline;
   (c) providing at least one heat flux sensor and regulating an operating temperature of said at least one heat flux sensor;
   (d) forming a grid on said selected area, said grid defining a plurality of side-by-side sensor locations each corresponding respectively to an area covered by one heat flux sensor; and
   (e) measuring the heat flux received at each sensor location by means of said at least one sensor, the or each sensor being moved sequentially from one sensor location to an adjacent sensor location after the heat flux on said one sensor location has been measured.

2. A method of measuring heat flux according to claim 1, said operating temperature is regulated by a water cooling system including at least one thermometer for measuring the water temperature of said cooling system.

3. A method of measuring heat flux according to claim 2 wherein, during the heat flux measuring step, said at least one heat flux sensor is maintained at an operating temperature in the range of 65° F. to 75° F. by said water cooling system.

4. A method of measuring heat flux according to claim 2 wherein said water cooling system includes water passages formed in a base layer of the or each heat flux sensor.

5. A method of measuring heat flux according to claim 1 wherein said radiant tube heater has a blower and a predetermined firing rate and said heating tube extends the length of said area.

6. A method of measuring heat flux according to claim 1 wherein said radiant tube heater has an insulated reflector extending along and above the heating tube.

7. A method of measuring heat flux according to claim 1 wherein said enclosing wall has a height of at least 3 feet and extends about the entire perimeter of said selected area.

8. A method of measuring heat flux according to claim 1 wherein said grid is formed by longitudinal and transverse lines drawn on said surface to define said sensor locations.

9. A method of measuring heat flux according to claim 1 wherein the or each heat flux sensor is a transducer-type heat sensor providing a voltage readout.

10. A method of measuring heat flux according to claim 9 wherein the or each heat flux sensor is a semi-conductor thermopile.

11. A method of measuring heat flux according to claim 10 wherein the or each heat flux sensor comprises a plurality of Bi/Te elements capable of generating a DC voltage due to Seebeck effect.

12. An apparatus for measuring heat flux received on a selected surface area from a radiant tube heater, said apparatus comprising:
   a wall arrangement for enclosing said selected surface area and adopted to extend along and upwardly from side edges of said selected surface area;
   a movable, planar heat flux sensor capable of covering a selected small portion of said selected surface area and of providing a voltage readout indicative of the heat flux received on said small portion over a selected time interval; and
   a temperature control system for regulating an operating temperature of the heat flux sensor during use.

13. An apparatus for measuring heat flux according to claim 12 wherein said wall arrangement is at least three feet high along its length.

14. An apparatus for measuring heat flux according to claim 12 wherein said heat flux sensor is a semi-conductor thermopile capable of providing a voltage readout up to at least 1000 millivolts.

15. An apparatus for measuring heat flux according to claim 14 wherein said semi-conductor thermopile comprises a plurality of Bi/Te elements capable of generating a DC voltage due to Seebeck effect.

16. An apparatus for measuring heat flux according to claim 12 wherein said temperature control system includes a water cooling system connected to the heat flux sensor and at least one thermometer for measuring water temperature of the cooling system.

17. An apparatus for measuring heat flux according to claim 16 wherein said water cooling system includes water passages formed in a base layer of the heat flux sensor and a pump, wherein during use of said cooling system, water is circulated through said water passages by means of the pump.

18. An apparatus for measuring heat flux according to claim 12 including a radiant tube heater having a blower and a radiant heating tube connected to an outlet of said blower, said radiant heating tube sized to extend the length of said selected surface area which is rectangular.

19. An apparatus for measuring heat flux according to claim 18 wherein said radiant tube heater includes an elongate insulating reflector extending along and above the heating tube.

20. An apparatus for measuring heat flux according to claim 12 wherein said planar heat flux sensor is square and its length and width are each less than one foot.

* * * * *